United States Patent Office
3,756,797
Patented Sept. 4, 1973

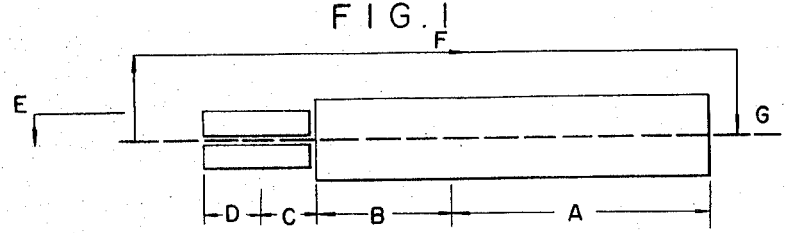
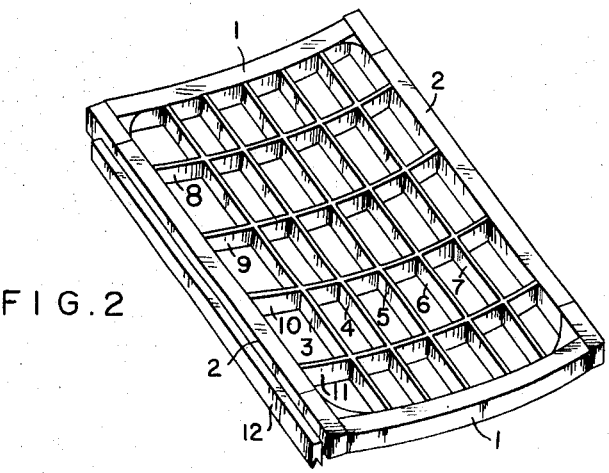
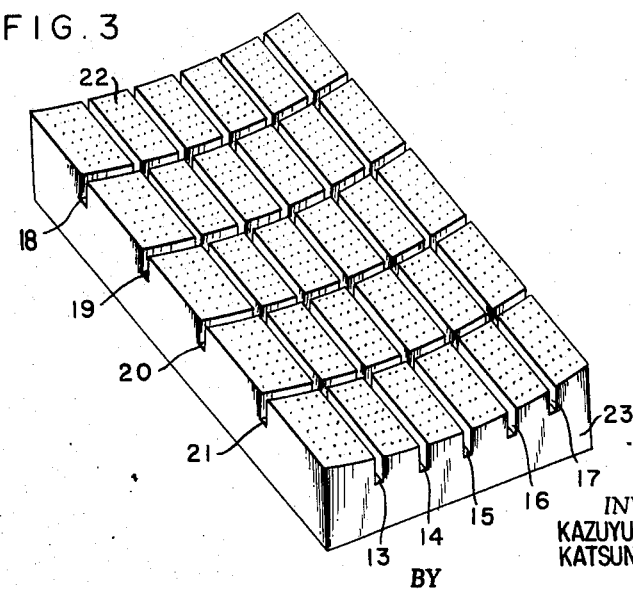

3,756,797
METHOD AND APPARATUS FOR BENDING A SHEET OF GLASS
Kazuyuki Akeyoshi, Yamato, and Katsunori Suga, Yokohama, Japan, assignors to Asahi Glass Company, Ltd., Tokyo, Japan
Filed July 16, 1971, Ser. No. 163,316
Claims priority, application Japan, July 16, 1970, 45/61,746
Int. Cl. C03b 23/02
U.S. Cl. 65—25 A
10 Claims

ABSTRACT OF THE DISCLOSURE

A sheet of glass positioned on a truck type bending mold having suitable curvature and latticework is conveyed into a main heating zone being received in a hearth bed therein having grooves corresponding to the latticework for ejecting hot gas from a plurality of holes to the lower surface of the glass on the truck, whereby a sheet of glass having a complex shape may be accurately bent into a predetermined curvature.

BACKGROUND OF THE INVENTION

Field of the invention

This invention relates generally to a method and apparatus for bending a sheet of glass, and more particularly to a method for accurately bending a sheet of glass having a complex shape into a predetermined curvature by using a truck type bending mold and ejecting hot gas from a bed below the sheet of glass.

Description of prior art

Various methods are known for bending a sheet of glass, such as a gas supporting furnace process, an outline mold process and a bend pressing process. Where a sheet of glass is to be bent in a low curvature, the gas supporting furnace process is usually employed. This process is accomplished in an elongated furnace having an elongated bed supported therewithin and having passages in the hearth bed for supplying hot gas over the bed to support the sheet of glass on the gas as the sheet is moved along the bed by a plurality of rotating discs. The discs are in contact with an edge of the floating sheet of glass at all times during the movement of the sheet over the bed. Thus, the gas supporting furnace process is quite effective for continuously bending a large number of sheets of glass having a simple shape and the same curvature for being readily guided therethrough. However, serious disadvantages of the gas supporting furnace process have been found in conveying a sheet of glass therethrough having a complex shape.

On the other hand, the outline mold process can be applied for bending a sheet of glass having various complex shapes. However, this process has been determined to have other serious disadvantages, such as low accuracy of the curvature being caused by sagging and appearance of traces and flaws on the curved sheet of glass, depending upon the weight thereof, the support area for the glass sheet and the time it is kept at the processing temperature. Moreover, the outline mold process is a batch process, and accordingly the productivity is quite low.

On the other hand, in the bend pressing process, a sheet of glass is hung by tongs. Accordingly, a flaw caused by the tongs often occurs on the sheet of glass. Moreover, this bend pressing process is not suitable for bending a sheet of glass having a complex shape.

Thus, until now, a suitable continuous process for accurately bending a sheet of glass having a complex shape has not been known. In the method for bending a sheet of glass, according to this invention, it is possible to readily process a sheet of glass having any complex shape, that is, one cut in a shape having any curved form of side line, whereas such a sheet of glass having no straight side line parallel to the axis of curvature cannot be conveyed in the conventional gas supporting furnace process and is difficult to accurately convey and be bent in other continuous methods.

SUMMARY OF THE INVENTION

Accordingly, it is an object of the present invention to provide a method for continuously and accurately bending a sheet of glass having complex shape with all of the advantages of the conventional gas supporting furnace process and outline mold process.

It is another object of the present invention to provide a method for bending a sheet of glass having complex shape without causing any trace or flaw therein.

Still another method of this invention is to provide new and improved apparatus for bending sheets of glass having complex shapes without causing any traces or flaws therein.

These and other objects are attained according to this invention by a continuous method for bending a sheet of glass having a complex shape in which the sheet of glass is conveyed on a suitably curvatured truck type bending mold having latticework therein into a preheating zone for heating the sheet of glass below a deforming temperature, and the sheet of glass together with the bending mold is then conveyed into a main heating zone kept at the deforming temperature, wherein a hearth bed having grooves corresponding to the mold latticework is provided, and the lattice work of the bending mold is fitted into the grooves of the hearth bed to bend the sheet of glass. The truck type bending mold holding the curved sheet of glass is then separated from the hearth bed and is conveyed on the bending mold into a tempering and cooling zone, whereby the appearance of trace and flaw usually caused by contact with the mold is prevented by decreasing the weight per unit area of the sheet of glass on the bending mold.

According to this invention, a truck having suitable curvature and a plurality of lattices is employed, and a sheet of glass having complex shape may be placed on this latticework to continuously be conveyed into a furnace having a preheating zone and a main heating zone. In the furnace, the hearth bed having the grooves corresponding to this latticework of the mold for receiving the same also has a plurality of holes for ejecting hot gas to support the sheet of glass. The furnace consists of a preheating zone and a main heating zone. In the preheating zone, the sheet of glass is heated to just below the deforming temperature. Accordingly, the upper surface of the hearth bed in this zone can be flat, or no hearth bed at all need be used. In the main heating zone, the sheet of glass is heated to at least the deforming temperature, whereby the sheet of glass is bent on the truck over the suitably curvatured hearth bed, by ejecting hot gas therefrom to lift the sheet of glass, so that the area supporting the sheet of glass is increased for decreasing the affect of dead-weight on the bending mold to prevent traces or flaws being caused on the curved sheet of glass. The curved sheet of glass may be conveyed on the truck to a rapidly cooling zone for tempering, and then is removed from the truck, which is returned to the original position for receiving another sheet of glass.

BRIEF DESCRIPTION OF THE DRAWINGS

Various other objects, features and attendant advantages of this invention will be more fully appreciated as the same becomes better understood from the following detailed description when considered in connection with the accompanying drawings, in which like reference numerals designate like or corresponding parts throughout the several figures, and wherein:

FIG. 1 is a diagrammatical view of an apparatus for bending a sheet of glass according to the teachings of this invention;

FIG. 2 is a perspective view of a truck type bending mold used in practicing the method of this invention;

FIG. 3 is a perspective view of a hearth bed for use in a main heating zone in one embodiment of this invention;

DESCRIPTION OF THE ILLUSTRATED EMBODIMENTS

Figure 4:
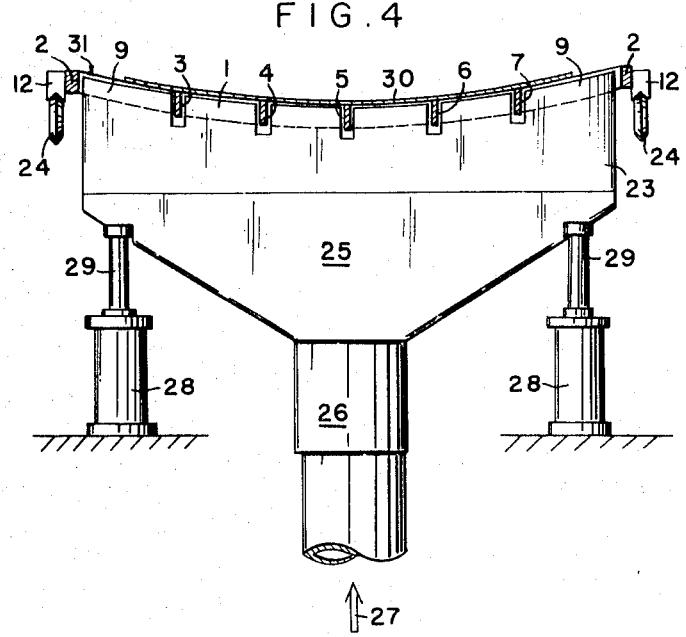
FIG. 4 is an end cross-sectional view of the truck and hearth bed positioned in the main heating zone.

Referring now to the drawings, and more particularly to FIG. 1 thereof, an apparatus for bending and tempering a sheet of glass in accordance with this invention is illustrated as comprising a preheating zone A, a main heating zone B, a tempering zone C and a cooling zone D. A hearth bed having a suitable curvature is provided in the main heating zone B. The sheet of glass to be processed is placed on a truck at a position G in front of the preheating zone A and the completed curved sheet of glass is picked up from the truck at a position E, whereupon the truck is returned along the path F to the position G, as indicated by the arrows.

FIG. 2 illustrates a truck type bending mold for conveying a sheet of glass. The bending mold has parallel main yokes 1 and parallel side yokes 2 supporting longitudinal latticework 3, 4, 5, 6, and 7 and lateral latticework 8, 9, 10 and 11 formed with a specific curvature in its top surface corresponding to the desired finished product of a specifically curved sheet of glass. The truck type bending mold is supported by guide members 12 secured to the side yokes 2 and is conveyed on rollers 24 arranged thereunder as shown in FIG. 4.

In FIG. 4, there is shown a hearth bed 23 having an upper surface curvature corresponding to the curvature of the desired finished product of a curved sheet of glass and having longitudinal grooves 13, 14, 15, 16 and 17 and lateral grooves 18, 19, 20 and 21 corresponding to the latticework 3 through 11 which accordingly is receivable in the grooves. An indefinite number of holes 22 for ejecting hot gas are provided in the surface of the hearth bed 23.

A bending operation of a sheet of glass 30 in the main heating zone B is illustrated in FIG. 4. The truck type bending mold supported by the guide members 12 is conveyed on the horizontally arranged rollers 24. Accordingly, to bend the sheet of glass 30, the conveying of the bending mold is stopped and the hearth bed 23, shown in FIG. 3, is raised from below to approach the sheet of glass. Pressurized hot gas is ejected from the hearth bed through the holes 22 to provide floating power for the sheet of glass 30, thereby lightening the dead weight thereof on the mold latticework. The sheet of glass 30 is not completely floated as in the conventional gas furnace process, but rather only the dead weight of the glass on the bending mold is decreased. The hot gas is supplied from the bottom of the hearth bed 23 to which a duct 25 and a vertically sliding pipe 26 are connected. The hearth bed 23 is provided with a lifting means, such as, for example, support or elongate rods 29 slidable within cylinders 28.

The lifting means is actuated when the bending mold is disposed above the hearth bed 23 for lifting the hearth bed 23 so as to fit the latticework 3 through 11 of the bending mold within the grooves 13 through 21 of the hearth bed 23. As the surface of the hearth bed 23 approaches the glass sheet 30, the sheet is bent along the latticework of the bending mold by heating it at a temperature greater than its deforming temperature. The dead weight of the glass sheet is lightened by the hot gas ejection. Moreover, each partition formed by the latticework offers the effect of a pressure chamber, as the bending mold on which the sheet of glass is placed is approached by the surface of the hearth bed. Accordingly, uniform floating power in each part of the sheet of glass 30 can be easily provided, so that a trace or flaw can be prevented and the sag of the glass sheet between the latticework can be effectively prevented.

The curvature accuracy of the curved sheet of glass is not determined by the curvature of the hearth bed, but is determined instead by the curvature of the bending mold. Accordingly, it is possible to employ a hearth bed having lower curvature accuracy in comparison with that of the conventional gas furnace process.

Figure 8:
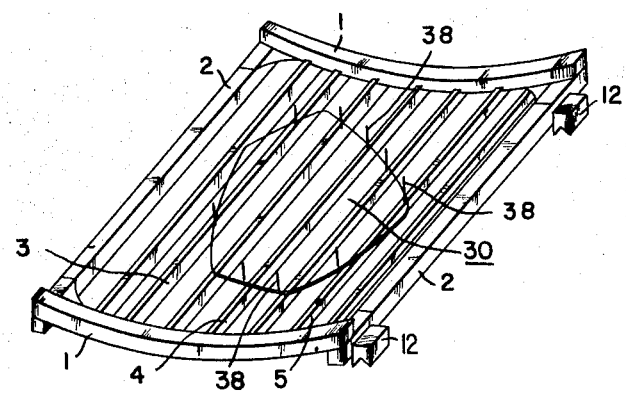
FIG. 8 is a perspective view of another truck type bending mold.

In order to prevent movement of the sheet of glass 30 on the truck by the ejecting pressurized hot gas in the bending step, the sheet of glass can be fixed as to position on the bending mold with pins 38, as shown in FIG. 8. In order to prevent a trace or flaw from occurring, temperature controls are provided for both surfaces of the sheet of glass 30 in the main heating zone so that the temperature of the lower surface of the sheet is relatively lower than that of the upper surface of the sheet.

After bending the sheet of glass 30, the hearth bed 23 is lowered, and the sheet of glass being supported on the truck is conveyed to the tempering zone C and the cooling zone D to rapidly cool and temper it while it is still on the truck. Conveyance of the truck is continuous in the preheating zone. In the latter part of the preheating zone, the truck moves faster, and in the main heating zone, the truck is slowed down and stopped during the period of bending the glass sheet. Then the truck is conveyed again so as to continuously convey it through the remaining zones. An intermittent conveyance of the truck for progressing it a specific distance and then stopping it for a specific period can be readily attained, if desired, throughout the total process.

It also is possible to move the bending mold vertically while fixing the hearth bed 23, instead of moving the hearth bed 23, while horizontally conveying the truck in this embodiment. In this embodiment, although a cylindrical curve bending of the sheet of glass has been illustrated, it is also possible to apply the same method for bending the sheet of glass in a spherical curve or other complex curve. On the other hand, when a curved sheet of glass having the same curvature and a different shape is desired, it is possible to employ the same bending mold. Similarly, although the method illustrated herein is for preparing a concave sheet of glass, it is, however, just as possible to use this same method for preparing a convex sheet of glass.

Figure 5:
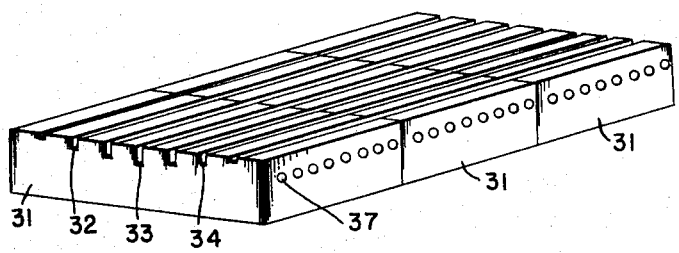
FIG. 5 is a perspective view of another hearth bed for use in a preheating zone in another embodiment of this invention.

In another embodiment of this invention, as shown in FIG. 8, the truck type bending mold has longitudinal latticework 3, 4 and 5, main yokes 1 and side yokes 2, all having a curvature the same as that of the finished product of a curved sheet of glass, wherein the longitudinal latticework are fixed at their ends on the main yokes. The truck type bending mold is supported by bedplates or guides 12, for being conveyed on rollers 24 arranged under both sides of the bending mold. Shown in FIG. 5 is a hearth bed 31 which may be used in the preheating zone A, having a flat upper surface, because the sheet of glass is still flat in this zone. An indefinite number of holes 36 for ejecting hot gas and holes 37 for drawing in the gas may be provided respectively on the upper surface of the hearth bed and in the side walls thereof, as shown in FIG. 6 yet to be described.

A plurality of grooves 32, 33 and 34 are provided being parallel to the direction of progression of the sheet of glass on the surface of the hearth bed 31, and the longitudinal latticework 3, 4, and 5 are set into these grooves. The truck carrying the sheet of glass is supported by the guides 12 and is conveyed into the preheating zone in which the sheet of glass is preheated by the hot gas being ejected from the surface of the hearth bed 31 and heat from an upper part. The preheated sheet of glass 30 is then conveyed to the main heating zone B and is further heated at the softening temperature.

Figure 6:
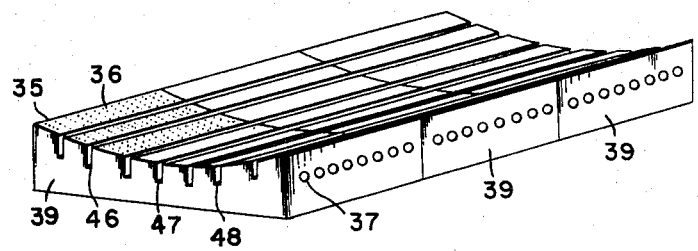
FIG. 6 is a perspective view of still another hearth bed designed for use in a main heating zone.
Figure 7:
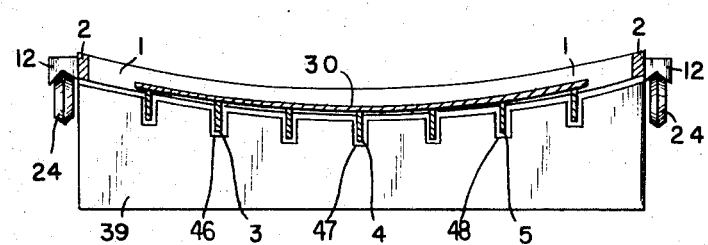
FIG. 7 is an end view of the truck and hearth bed positioned in the main heating zone.

FIG. 6 shows a hearth bed 39 designed for use in the main heating zone B and having a special curvature. The hearth bed 39 gradually forms a curved surface from the latter part of the preheating zone to the main heating zone, and finally takes the form of the curved surface shown in FIG. 6 in the main heating zone. Thus, grooves 46, 47 and 48 of the curved hearth bed 39 in the main heating zone are respectively aligned with each of the grooves 32, 33 and 34 of the hearth bed 31 in the preheating zone and the longitudinal latticework 3, 4 and 5 of the truck illustrated in FIG. 8 are passed along the grooves, as shown in FIG. 7.

In the main heating zone B, the surface of the hearth bed 39 has a curvature corresponding to that of the curved sheet of glass that is to be formed and a small gap is formed between the hearth bed and the sheet of glass. Hot gas is ejected from a plurality of holes 36 in the hearth bed 39 to the sheet of glass 30 to heat it and to impart floating power to it. The sheet of glass 30 is heated to a deforming temperature and is bent to conform to the curvature of the main yokes 1 of the banding mold. At the same time, the pressure of the hot gas raises the glass sheet so that the dead weight thereof is decreased, and traces and flaws can thereby be prevented. But, as indicated hereinbefore, the glass sheet 30 is not completely floated free of the latticework of the truck. Moreover, sagging of the glass sheet between the truck latticework can thus be effectively prevented. In order to prevent the glass sheet from being moved on the truck by the ejecting pressurized hot gas, the sheet of glass can be fixed on the bending mold with pins 38, shown in FIG. 8.

In a third embodiment of this invention, apparatus being substantially the same as that of the first embodiment except for the depth of grooves in the hearth bed is employed. The truck type bending mold shown in FIG. 2 is employed, having main yokes 1, side yokes 2, a longitudinal latticework 3 through 7 having specific curvature and a lateral latticework 8 through 11 being supported by the guide members 12 for conveyance on rollers 24 arranged under both sides thereof.

The hearth bed 23 of FIG. 3, whose surface has a curvature corresponding to the curvature of the desired finished product and has grooves 13 through 21 corresponding to the latticework 3 through 11 of the bending mold for receiving the same therein, so that the spaces between the latticework are blocked by the hearth bed is employed in this embodiment. If preferable, a plurality of holes 22 for ejecting hot gas can be provided on the surface of the hearth bed 23.

Accordingly, in the bending step, conveyance of the sheet of glass 30 on the bending mold is stopped and the hearth bed 23 is raised upward to contact the sheet of glass, so that the lattices 3 through 11 are sunk into the grooves 13 through 21 of the hearth bed 23. The support of the sheet of glass is now taken up by the hearth bed which has a larger area in comparison with that of the bending mold, so that the value of the dead weight of glass per supporting area is minimized in bending the sheet of glass on the hearth bed, and traces and flaws can be completely prevented.

The surface of the hearth bed can be covered with fiber glass, asbestos cloth, carbon powders, and the like, for preventing traces and flaws. Heat can be supplied from the gas burners provided in the upper surface of the furnace, and in the surface of the hearth bed. The sheet of glass taken up by the hearth bed is thus heated by the conduction of heat from the surface of the hearth bed and the radiation of heat from the burners for bending the same. Thereafter, the hearth bed is lowered so that the curved sheet of glass may be taken up on the truck type bending mold and conveyed into the cooling zone.

Since the surface of the sheet of glass contacting the hearth bed is heated by only the conduction of heat from the hearth bed and the opposite surface is heated by the burners, the temperature of the surface contacting the hearth bed can be lowered to prevent the production of any trace or flaw. Many variations are, of course, possible as stated in the first embodiment of this invention.

In accordance with the method of this invention, employing the truck type bending mold and the hearth bed having grooves corresponding to latticework of the bending mold provides a novel method for continuous horizontal bending and tempering of a sheet of glass having a complex shape which could not be attained by conventional chain type and disc type gas supporting furnace processes. The invention is not limited to a continuous method for bending a sheet of glass having complex shape, however, for it is also possible to prepare a particular sheet of glass having a complex curvature by selecting the truck type bending mold and hearth bed.

Obviously, many modifications and variations of this invention are possible in light of these teachings. It is to be understood, therefore, that within the scope of the appended claims, the invention may be practiced otherwise than as specifically described herein.

What is claimed as new and desired to be secured by Letters Patent of the United States is:

1. A method for bending a sheet of glass having a complex shape comprising the steps of:
   conveying a sheet of glass on a truck type bending mold having latticework forming a preselected curvature into a preheating zone and heating the sheet of glass to just below its deforming temperature;
   conveying said bending mold and said glass sheet supported thereon into a main heating zone for heating said glass to at least its deforming temperature;
   supporting the bending mold in said main heating zone on a hearth bed of said preselected curvature having grooves corresponding to said latticework for receiving the latticework of said bending mold therein to bend the sheet of glass;
   heating said sheet of glass within said main heating zone so that said sheet of glass attains said preselected curvature; and
   separating said truck type bending mold carrying the curved sheet of glass from the hearth bed and conveying the curved sheet of glass on the bending mold out of said main heating zone.

2. A method for bending a sheet of glass having a complex shape according to claim 1, further comprising the step of ejecting hot gas through said hearth bed to decrease the dead weight of said glass sheet on said bending mold while bending the same.

3. A method for bending a sheet of glass having a complex shape according to claim 1, further comprising the steps of supporting the sheet of glass on said hearth bed through said bending mold by fitting the latticework of the bending mold deeply into the grooves of said hearth bed; and heating said glass sheet conductively through said hearth bed.

4. A method for bending a sheet of glass having a complex shape according to claim 1, further comprising fitting at least part of the latticework of said bending mold into the grooves of said hearth bed and sliding the same continuously through the main heating zone.

5. A method for bending a sheet of glass having a complex shape according to claim 1, further comprising the step of securing the glass sheet on the bending mold so as to prevent the movement of said sheet relative to said mold.

6. Apparatus for bending a sheet of glass comprising:
 a preheating zone for heating said glass sheet to just below its deforming temperature;
 a bending mold having a preselected curvature and formed with latticework upon which said glass sheet may be supported;
 a main heating zone for heating said glass sheet to at least its deforming temperature;
 a hearth bed in said main heating zone being formed with at least one surface thereof curved corresponding to the curvature of said bending mold and having a plurality of grooves therein corresponding to the latticework of said bending mold for receiving the same therein;
 means for vertically adjusting the relative positions of said bending mold and said hearth bed in said main heating zone such that the latticework of said mold is received within the grooves of said bed;
 means for heating said glass sheet through said hearth bed for bending the same to conform to the curvature of said bending mold; and
 means for conveying said bending mold through said preheating zone and said main heating zone.

7. Apparatus according to claim 6, wherein said means for heating said glass sheet through said hearth bed comprises a plurality of openings in said at least one surface of said hearth bed adapted to eject a pressurized hot gas against the adjacent surface of said glass sheet.

8. Apparatus according to claim 6, wherein said latticework of said bending mold comprises longitudinally and laterally oriented latticework.

9. Apparatus according to claim 6, wherein said grooves in said hearth bed are longitudinally oriented grooves for slidably receiving said latticework of said bending mold.

10. Apparatus according to claim 6, wherein said grooves in said hearth bed are longitudinally oriented grooves and laterally oriented grooves intersecting therewith.

References Cited
UNITED STATES PATENTS 3,468,645   9/1969   McMaster et al. ____ 65—273 X ARTHUR D. KELLOGG, Primary Examiner

65—107, 182 A, 287